Sept. 22, 1953  F. J. HOOVEN  2,653,290
ELECTRICAL SYSTEM
Original Filed April 29, 1944  2 Sheets-Sheet 1

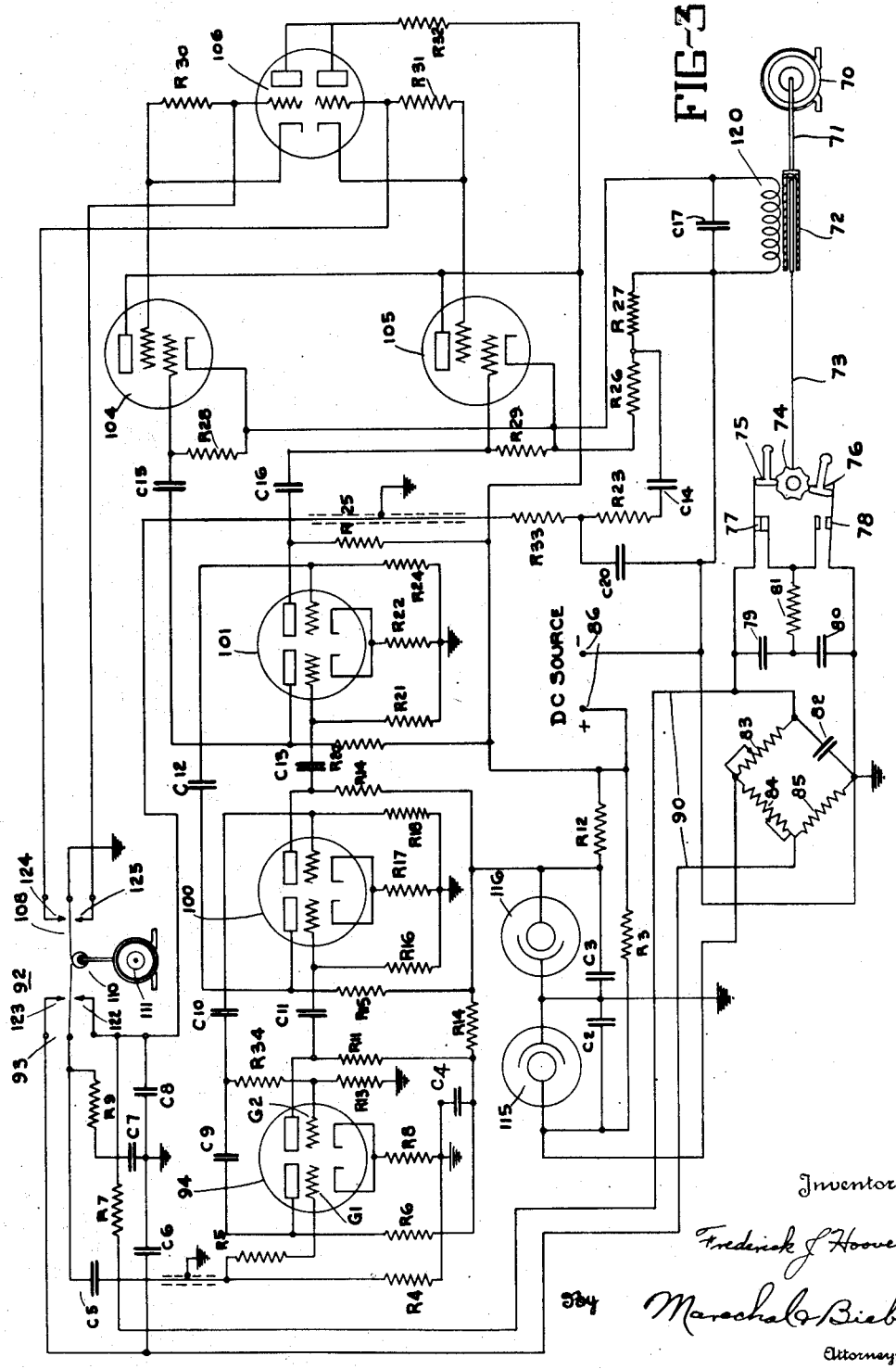

Patented Sept. 22, 1953

2,653,290

UNITED STATES PATENT OFFICE 2,653,290

ELECTRICAL SYSTEM

Frederick J. Hooven, Dayton, Ohio

Original application April 29, 1944, Serial No. 533,431, now Patent No. 2,555,491, dated June 5, 1951. Divided and this application May 15, 1951, Serial No. 226,503

12 Claims. (Cl. 318—309)

This invention relates to electrical systems and more particularly to electrical systems responsive to speed or time intervals.

It is the principal object of the invention to provide an electrical system for accurately measuring and affording an indication of the speed of operation of an element, such as the speed of rotation of a shaft for example, and more generally of the frequency and period of a regularly recurring function and hence of the timing of intervals between successive recurrences, particularly where the frequency is relatively high and the intervals short.

It is a further object of the invention to provide a simple, reliable and highly accurate electrical system utilizing the equivalent resistance or other electrical characteristic of a condenser circuit for producing a response proportional to the speed or time intervals of a recurring function and such response being directly usable for purposes of indicating, measuring, or regulation of the timing of the function.

It is a further object of the invention to provide such a system in which a control is developed for regulating the speed of rotation of a shaft or other recurring function accurately within a predetermined range.

It is a still further object to provide an electrical method of accurately measuring speed or time intervals which does not require use of tachometers or the like and in which the intervals are measured in terms of the response of an electrical circuit.

Other objects and advantages will be apparent from the following description, the accompanying drawing and the appended claims.

In the drawing,

Fig. 3 is a diagrammatic view of a complete control system for the regulation of speed incorporating an amplifier.

This application is a division of copending application Serial No. 533,431, filed April 29, 1944, now Patent No. 2,555,491, issued June 5, 1951.

In many cases it is desirable to develop a control or indicator accurately responsive to a condition of speed, in order to provide an electrical function which is proportional to speed or to the frequency or period of a recurring function. In accordance with the present invention, an electrical control system is provided which is continuously responsive to the speed or frequency of the recurring function, and which responds thereto with great accuracy over a wide spread range including particularly the upper portion of the speed range where normally it is relatively difficult to indicate or determine the speed accurately.

The present system develops an electrical characteristic which is directly variable with the speed or frequency, and also provides for the development of such characteristic in a way which makes it substantially independent of the applied voltage of the available power source such that great accuracy may be thus maintained.

The invention further provides for the application of such electrical characteristic for various purposes, including the indication or measurement of the particular speed or frequency, thus providing a direct indication which gives great accuracy over the desired wide range of speeds. Further, the invention provides for the utilization of such electrical characteristic for the purpose of regulating or controlling the function itself, thereby providing a regulating system for maintaining a predetermined desired speed or frequency with a high degree of accuracy over a wide range of speeds.

Figure 1:
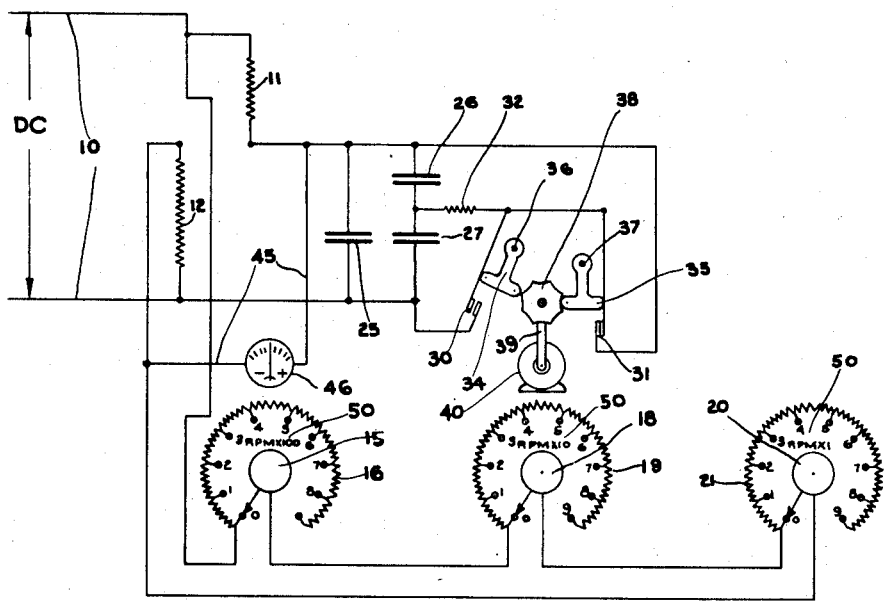
Fig. 1 is a diagrammatic representation of a simple circuit in accordance with the present invention adapted for the measuring and indicating of speed or of time intervals.

Referring to Fig. 1, there is shown a source of direct current potential 10, which may be of any desired voltage, preferably a constant voltage source although that is not essential to the accurate functioning of the system. This power source is connected to a Wheatstone bridge which includes resistors 11 and 12 in two of its opposite legs. A third leg includes a series of resistors preferably arranged to be controlled by decade switches. Thus a first switch 15 controls each of resistors 16 which are of relatively large size, for example 100 ohms each. A second switch 18 controls resistors 19 which are smaller in size, for example 10 ohms each. A third switch 20 controls resistors 21 which are relatively small, for example 1 ohm each. It will thus be evident that by suitably setting the several switches, any intermediate value of resistance may be secured from 1 to 1000 in steps of one ohm.

The resistor normally used in the fourth leg of the bridge is replaced by a condenser 25 of relatively large capacity, this condenser being in effect an electrical reservoir from which small charges may be rapidly withdrawn without materially reducing the total charge or the voltage across the terminals of the condenser. A pair of condensers 26 and 27 of substantially smaller capacity are connected parallel therewith. A pair of switches 30 and 31 are connected respectively across the condensers 26 and 27, the common connection therebetween incorporating a suitable resistor 32.

Actuating members comprising pivoted arms 34 and 35 which are pivoted respectively at 36 and 37 are arranged to be actuated by means of a cam 38 carried on the shaft 39 of the drive motor 40. The switches and the actuating arms are arranged for alternate operation so that when switch 30 is open, switch 31 is closed. This establishes a charging circuit for condenser 27 through switch 31 and resistor 32. Thereafter switch 31 is opened and switch 30 is closed, the sequence being in the order given, short circuiting and discharging condenser 27, and establishing a charging circuit for condenser 26. The speed of operation of the switches may be high, of the order of several thousand times per minute but the capacity and resistance of the circuits are so chosen that the time required for charging and discharging are both much less than the periods of the switch operations, and hence at the time the switches open, the current flow has practically ceased and there is no objectionable arcing. Resistor 32 may be a separate component or may represent the inherent resistance of the associated circuit. Thus the two condensers are alternately charged and discharged from the large capacity condenser 25 and in direct timed relation with the rotation of the motor shaft so that the frequency of the switch operation is a direct function of the motor speed. Condenser 25 with the associated bridge resistance has a time constant which is large with respect to the time constant of condensers 26 and 27 and resistor 32, and thus forms a source of voltage which is substantially constant over the period of charging of condensers 26 and 27.

The balance circuit of the bridge is shown at 45, and may include a sensitive indicating instrument such as galvanometer 46.

When a condenser is charged from a source of constant voltage, such as condenser 26, or 27, being charged from the large capacity condenser 25, the amount of energy withdrawn from the source is equal to twice the amount eventually stored in the charged condenser. That is, the energy stored in condenser 26 during the charging cycle is determined by the formula $$j=\frac{E^2C}{2} \text{ joules} \tag{1}$$

The remaining half of the energy withdrawn from condenser 25 is dissipated in heat, in whatever resistance is present in the charging circuit, however large or small that resistance may be. The value of the resistance affects the rate of charge, but does not change the inherent condition of the energy loss in the charging operation which is always equal to the energy ultimately stored in the charged condenser itself.

Thus if condensers 26 and 27 are alternately charged from condenser 25, and discharged N times per second, the total power dissipated will be $$W=E^2CN \text{ watts} \tag{2}$$

If C is in farads and E is in volts, W will be in watts.

From this analysis it will be clear that there is a power dissipation in the alternately charged and discharged condenser circuit which is equivalent to the power which would be dissipated within a circuit including a resistor connected across a power source. In the latter case the power dissipated is represented by the equation $$W=\frac{E^2}{R} \tag{3}$$

Equating the two powers, we may write $$E^2CN=\frac{E^2}{R} \tag{4}$$

from which $$R=\frac{1}{CN} \tag{5}$$

From this it will be apparent that the equivalent resistance of the condenser circuit above described is actually independent of the value of the resistance in the circuit, and is dependent only upon the capacity of condensers 26 and 27 and on the frequency or speed of operation of switches 30 and 31.

It will be clear that with any fixed ratio of the bridge resistances, there will be only one speed of operation of the motor which will establish an equivalent resistance in the condenser circuit to provide for balance of the bridge. By any suitable means the motor speed may be varied to a condition where such resistance is obtained, in which event the galvanometer 46 will show a zero deflection and the speed will then be accurately at the predetermined value. It will also be noted in this connection that under these circumstances the bridge is and remains balanced independently of changes such as may occur in voltage of the source 10 and hence such fluctuations as occur therein will not affect the accuracy of the indication.

With the use of the decade switches 15, 18 and 20 as described, and by suitable calibration of the scales 50 associated with such switches, it will be clear that the bridge can be brought into a condition of balance with the motor 40 operating at a predetermined speed. The adjustable switch contacts are shifted until the instrument 46 indicates no current flow, and the scales 50 may then be read either as the equivalent resistance of the condenser circuit or directly in terms of speed, giving a highly accurate reading in both cases.

Where it is desired to read time intervals rather than speed, the variable resistances may be placed in one of the legs adjacent the leg containing the condenser. The balancing of the bridge through the setting of the decade switches in this case will represent the reciprocal values of speed, i. e. time intervals or period between switch operations, the several scales being suitably calibrated for that purpose.

Figure 2:
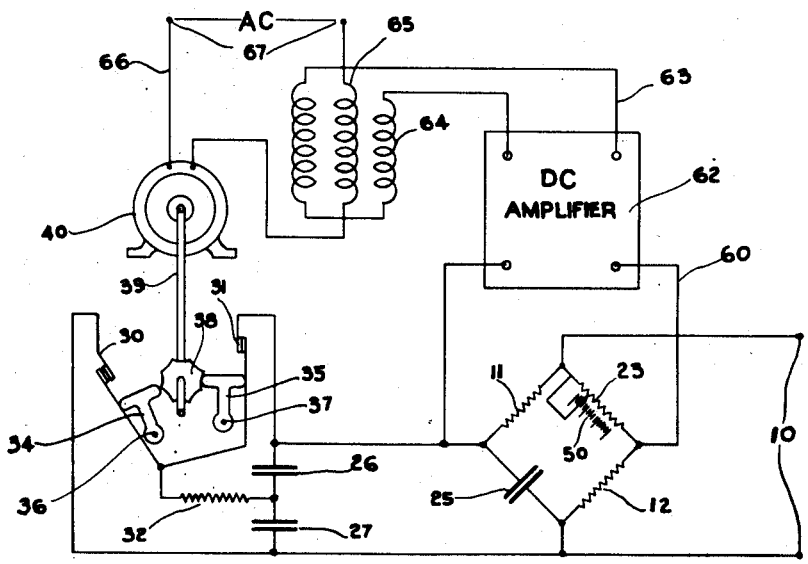
Fig. 2 is a diagrammatic view showing a control system in accordance with the present invention incorporating provision for regulating the timing of a recurring function such as the speed of a driven shaft.

The invention is also adapted for accurate control and regulation of the speed of the motor itself. Such a control is shown in Fig. 2 where the corresponding parts have the same reference numerals. In this embodiment the decade resistances and switches have been replaced by a variable resistor 23. While only resistor 23 has been described as variable, it will be clear that either or both resistors 11 and 12, as well as the capacity of the condensers 26 and 27 may be varied to establish the desired ratios and ranges for different applications. A balance circuit 60 is connected across the balance points of the bridge, and this circuit is made to constitute the input to a direct current amplifier 62 of any suitable or desired characteristics. Preferably it is an amplifier which provides an output current varying in proportion to the applied potential, and functioning to increase the output current in response to a change of applied voltage in one direction and to decrease the output current in response to a change of applied voltage in the opposite direction.

The output circuit 63 of the amplifier thus supplies an amplified direct current the value of which is directly proportional to the increase or decrease of the balance current flowing through the bridge. Such output circuit is then connected to control the speed of the drive element, a suitable means for so doing comprising a saturating reactor 64 which thus controls the flow of current through the coil 65, which is included in the circuit 66 supplying power to the motor 40 from a suitable alternating current source as indicated at 67.

In the utilization of such circuit the bridge is so adjusted that there will be a predetermined flow of current through the balance circuit when the motor is operated at the desired speed. Any increase or decrease in the speed of the motor will then effect a corresponding change in the voltage across the balance circuit. This changing voltage of the balance circuit is supplied to the amplifier 62 and a flow of corresponding varying control current is supplied to the saturating coil 64 to thus regulate the flow of the main motor current in the circuit 66 to bring about a correction in the speed of the motor whenever that speed departs from the value determined by the setting of the bridge resistors. In this way the speed of the motor is regulated, the equivalent resistance of the condenser circuit being continuously responsive to the motor speed and providing a regulating current also continuously responsive in the proper sense and of the proper amount to correct for any departure of the motor speed from the predetermined value.

Thus it may be seen that for any given desired speed of motor 40 there will be a set of operating conditions for which the bridge circuit is exactly balanced. Should the load on motor 40, or the voltage of source 67 be changed the current in the saturating coil 64 will increase or decrease in response to a slight decrease or increase in the speed of motor 40. The magnitude of this change in speed may be made as small as desired by suitable choice of sensitivity of amplifier 62 in order to provide any required accuracy of regulation. It is particularly advantageous that with the present control system a change in the applied voltage of source 19 does not affect the value of the speed at the balance point, since the bridge will be balanced at only one speed for each bridge setting regardless of the voltage applied to the bridge.

The bridge circuit is also especially useful in controlling or indicating a speed in terms of two variables. For example, in the bridge circuit shown in Fig. 2 the equivalent resistance of the leg of the bridge comprising condensers 25, 26 and 27, resistor 32 and switches 30 and 31, will be $$R_E = \frac{1}{240N(C_{26}+C_{27})} \quad (6)$$

where $N$ = speed R. P. M. shaft 39
$R_E$ = equivalent resistance, ohms
$C$ = capacity in farads Substituting for $$240(C_{26}+C_{27}) = K_1 \quad (7)$$

$$R_E = \frac{1}{K_1 N}$$

Since for the balance condition $$R_{23}R_E = R_{11}R_{12} \quad (8)$$

we have $$R_{23} = N \cdot K_1 R_{11} R_{12} \quad (9)$$

and likewise $$R_{23}/R_{12} = N \cdot K_1 R_{11} \quad (10)$$

Thus the speed of shaft 39 may be calibrated in terms of R. P. M. by varying $R_{23}$, or in terms of time per revolution by varying $R_{11}$ or $R_{12}$. For example, if the shaft 39 be connected to the spindle of a lathe it may be said that the cutting speed S for a given piece of work of radius $r$ will be $$S = 24\pi rN \quad (11)$$

where $r$ is in inches and S is in feet per minute. By making $R_{12}$ proportional to $r$ $$R_{12} = K_3 r \quad (12)$$

and $R_{23}$ proportional to cutting speed $$R_{23} = K_4 S \quad (13)$$

substituting (12) and (13) in (9) we have $$K_4 S = N \cdot K_1 R_{11} K_3 r \quad (14)$$

from which $$\frac{K_1 K_3 R_{11}}{K_4} = 24\pi \quad (15)$$

From this it is apparent that using the indicator, it would be possible, knowing the spindle speed to determine accurately the cutting speed which will be provided for a given radius of work or conversely to determine the radius for a given cutting speed. Likewise using the control circuit it will be possible to set into the bridge the work radius and cutting speed and thereby regulate the speed of the lathe to the correct value.

The above formulae also demonstrate clearly how the system of this invention indicates or determines speed in terms of accurately known and predictable electrical values, independently of any calibrated speed responsive devices or constant voltage sources. Such a system may be designed accurately for a given performance or calibration which can be predicted and held as closely as the values of a condenser and a resistor can be measured and held.

Referring now to Fig. 3, this figure shows diagrammatically a complete control system in accordance with the present invention for regulating the speed of a driven element. The drive motor is shown at 70, having a drive shaft 71 including a magnetic coupling member 72 which actuates a driven shaft 73, shaft 71 being operated at a speed always in excess of the speed at which it is desired to operate the driven shaft 73. On the driven shaft is the cam 74 providing for the alternate actuation of arms 75 and 76 which alternately open and close switches 77 and 78. The switches control the charging and discharging of the two small capacity condensers 79 and 80 through resistor 81, the condensers being charged from the large capacity condenser 82 included as one leg of the bridge circuit made up of resistors 83, 84 and 85. The main power source is shown at 86, this source supplying power not only for the bridge but also for the amplifier which is utilized in conjunction therewith.

The balance circuit of the bridge is shown at 90. In order to amplify the current in the balance circuit, it is preferred to convert this direct current flow to a flow of alternating current, to amplify such alternating current, and to then rectify the amplified current to reconvert the same to a direct current. For this purpose the balance circuit is connected with the input of the amplifier through a chopper circuit indicated generally at 92. This chopper has single pole double throw switch 93 which alternately connects the grid circuit of amplifier tube 94 with one side or the other of the balance circuit through the center leg of the switch which includes a resistor R5 and a condenser C5. Additional resistor R9 and condensers C7, C6 and C8 are connected respectively as shown in the diagram.

The amplifier is preferably arranged for push pull operation throughout, and to this end a phase inverter coupling circuit comprising condenser C9 and resistors R34 and R13 is used, R34 and R13 being so proportioned that the voltage applied to grid G2 of tube 94 is equal in voltage and opposite in polarity to that applied to grid G1 of tube 94. In amplifiers embodying such a phase inverter circuit, as heretofore used, the signal thus inverted is caused to pass through one more condenser resistor coupling circuit than the signal which is not inverted. In such circuits at frequencies so low that an appreciable shift in phase appears across each coupling circuit, one side of the signal is shifted in phase further than the other side, which results in low frequency instability, often called "motor boating." In accordance with the present invention, the signal not inverted is caused to pass through an additional coupling circuit comprising condenser C10 and resistor R18 having the same impedance relationship as the circuit comprising C9, R34 and R13, so that the same phase shift occurs in both sides of the signals at all frequencies, thus avoiding instability.

In the output circuit, there are two tubes 104 and 105, and the output circuit also includes a screen switching tube 106. The cathodes of tubes 104 and 105 are connected to coil 120 so that the plate current of both tubes flows through coil 120, to ground. The screen voltage is applied to tubes 104 and 105 through the two sections of the double tube 106, from the D. C. source 86, through resistor R32, the grids of which are alternately grounded by the contactor 108, driven in synchronism with contactor 92 by eccentric 110 rotated by motor 111. The result of the grounding of the grids of tube 106 is to render the two sections of the tube alternately non-conducting, thus applying screen voltage alternately to tubes 104 and 105. When the bridge circuit is in balance, that is, where the speed of shaft 73 is that for which resistors 83 and 84 have been pre-set, the voltage applied to grid G1 of tube 94 will not change as the contactor 92 alternately connects grid G1 to the two arms of the bridge. As a result, no signal is applied to the amplifier. In such a case there will be no voltage applied to the grids of tubes 104 and 105, and the current through these tubes under such conditions will be a certain value determined by the screen resistor R32, for example 20 milliamperes.

Now let the speed of shaft 73 increase slightly above the desired value, which will cause a decrease in the voltage across condenser 82, and thereby cause contact 122 to assume a negative voltage with respect to contact 123. A signal voltage is then applied to grid G1 of tube 94 which is positive while contacts 123 and 124 are closed, and negative when contacts 122 and 125 are closed. This signal, amplified, causes the grid of tube 105 to be positive while contact 124 is closed, and the grid of tube 104 to be positive while contact 125 is closed. Therefore the grid of each output tube is positive during that half of the cycle of operation of contactor 92 during which the screen voltage is not applied to that tube, and negative during that half cycle during which the screen voltage is applied. Thus the current through both tubes is decreased, and the torque of clutch 72 is reduced, causing the speed of shaft 73 to be reduced.

Should the speed of shaft 73 fall below the balance value, the opposite polarities will apply throughout, and the current in tubes 104 and 105 will increase, causing the speed of shaft 73 to increase.

It will be apparent, then, that the speed regulation of the system with change of load on the driven shaft 73 will be a function of the sensitivity of the amplifier. The speed will be exactly equal to the bridge balance setting, in the example given, when the torque on shaft 73 is that produced by a current of 20 milliamperes through coil 120. When the torque exceeds such a value, the speed will drop enough to produce a sufficient bridge unbalance to cause the current in coil 120 to increase to balance the increased torque. In a typical operating example a speed variation of $+\frac{1}{2000}$ of the balance speed is sufficient to cause a variation of from 4 to 40 milliamperes in the clutch coil 120 which corresponds to a torque variation from 0 to 4 inch ounces.

To prevent objectionable overshooting and hunting of the control a degenerative inverse feed back circuit is provided comprising resistors R33 and R23 and condenser C14 and C20 in the circuit arrangements shown. This circuit serves to add a direct voltage across circuit 90 which is in proportion to the rate of change of current through coil 120, and of such polarity as to oppose such change. This restricts the rate of change of current in coil 120 to a low value, preventing sudden changes of speed of shaft 73, thus preventing overcontrolling and hunting. It is necessary that the speed of shaft 73 change at a lower rate with changes of torque than the charge on condenser 82 changes with change of speed. To that end it is necessary that a certain minimum of rotating inertia be incorporated in the controlled system connected to shaft 73. In the example shown the inertia of the magnetic coupling is sufficient for this purpose, but where other types of speed control mechanism are used, a flywheel on this shaft may be necessary to avoid overcontrolling.

As a specific example, highly satisfactory and accurate results have been secured with the use of a motor 70 operable over the speed range of 400 to about 4000 R. P. M., the star wheel 74 being an 8 point cam and thus providing for the timed opening and closing of switches 77 and 78 at a speed of 3,200 to 32,000 times per minute. Resistor 81 was of 200 ohms and condensers 79 and 80 were each of .025 microfarad capacity, condenser 82 being of 4 microfarad capacity. Resistance 85 was 40,000 ohms and resistance 83 was adjustable from 20,000 to 60,000 ohms and resistance 84 was adjustable from 5,000 to 50,000 ohms, providing a variable ratio bridge circuit. Motor 111 was operated at such a speed as to result in actuating switches 92 and 98 at about 50 cycles per second, the speed of the motor thus being about 3000 R. P. M. when a single eccentric 110 is used. The voltage of the source 86 was 300 volts D. C., and voltage regulator 115 provided a voltage of 150 volts for the bridge circuit while voltage regulator 116 provided a voltage of 105 volts for the amplifier circuits. Tubes 94, 100, 101 and 106 were 6SN7 tubes and the output tubes 104, 105 were 6V6 tubes. The following table shows the resistance of the various resistor elements used in the above circuits, K being 1,000 and M being 1,000,000.

| Resistor | Ohms | Resistor | Ohms |
|---|---|---|---|
| R1 | 50 K | R18 | 3 M |
| R2 | 200 | R19 | 100 K |
| R3 | 12.5 K | R20 | 50 K |
| R4 | 1 M | R21 | 500 K |
| R5 | 100 K | R22 | 1 K |
| R6 | 200 K | R23 | 100 K |
| R7 | 100 K | R24 | 500 K |
| R8 | 1 K | R25 | 50 K |
| R9 | 75 | R26 | 1 M |
| R11 | 200 K | R27 | 100 K |
| R12 | 12.5 K | R28 | 500 K |
| R13 | 50 K | R29 | 500 K |
| R14 | 20 K | R30 | 2 M |
| R15 | 100 K | R31 | 2 M |
| R16 | 3 M | R32 | 5 K |
| R17 | 450 | R33 | 100 K |
|  |  | R34 | 2 M |

The capacity of the several condensers was as follows:

| Condenser | Capacity in Microfarads | Condenser | Capacity in Microfarads |
|---|---|---|---|
| C2 | 1.0 | C10 | 0.05 |
| C3 | 1.0 | C11 | 0.05 |
| C4 | 1.0 | C12 | 0.1 |
| C5 | 0.1 | C13 | 0.1 |
| C6 | 0.1 | C14 | 1.0 |
| C7 | 0.001 | C15 | 0.1 |
| C8 | 0.5 | C16 | 0.1 |
| C9 | 0.05 | C17 | 1.0 |
|  |  | C20 | 0.1 |

The invention thus provides a highly accurate control directly and instantaneously responsive to the speed of a recurring function such as the speed of rotation of a shaft or the like and provides for indication, measurement, and regulation of that recurring function. A regulating system such as that shown in Fig. 3 provides for greatly amplifying the bridge current, an amplification of several thousand times being readily available and resulting in a highly accurate control of the motor speed. It has been found for example that with such a system the speed of a shaft such as shaft 73 may be regulated to plus or minus one tenth of one per cent, or plus or minus 2 R. P. M., whichever is the greater, that accuracy being maintained throughout a range of speeds of from about 400 to 4000 R. P. M., and with a variation in the torque from about zero to two inch ounces. With constant torque the speed variation is even less than the above. It is thus evident that the control is highly flexible, adapted to a wide range of speeds and is particularly accurate under high speed conditions.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. An electrical system for regulating the rate of operation of an element comprising means for storing electrical energy, a condenser, switch means in circuit with said condenser and said storage means and operable to provide for alternately charging said condenser from said storage means to substantially the voltage thereof and thereafter substantially discharging the same, means for operating said switch means at a speed corresponding to the rate of operation of said element to constitute an equivalent resistance of said condenser circuit varying in inverse relation to the frequency of operation of said switch means, a bridge circuit of which the equivalent resistance of said condenser, said storage means, and said switch means constitutes one leg, and means controlled by said bridge circuit for regulating the speed of operation of said element to maintain a predetermined speed thereof.

2. An electrical system for regulating the rate of operation of an element comprising a reservoir of electrical energy of substantially constant voltage, a condenser, switch means establishing a circuit with said condenser and said reservoir and operable to provide for alternately charging said condenser from said reservoir and discharging the same, the time constant of said condenser charging and discharging circuit being substantially less that the periods of operation of said switch means, means for operating said switch means at a speed corresponding to the rate of operation of said element to constitute an equivalent resistance of said condenser circuit varying in inverse relation to the frequency of operation of said switch means, a bridge circuit of which the equivalent resistance of said reservoir, said condenser and switch means constitutes one leg, and means including said bridge circuit and responsive to the value of said equivalent resistance for regulating the speed of operation of said element to maintain a predetermined speed thereof.

3. An electrical system for regulating the rate of operation of an element comprising a relatively large capacity condenser in a circuit having a relatively large time constant, a condenser of relatively small capacity, switch means in circuit with both said condensers and operable at a speed corresponding to the rate of operation of said element for alternately charging said small capacity condenser from said large capacity condenser and thereafter discharging said small capacity condenser to develop an equivalent resistance in the circuit including said small capacity condenser and said large capacity condenser directly proportional to the rate of operation of said switch means, said condenser charging and discharging circuit having a relatively small time constant, and means connected in the supply circuit to said large capacity condenser and responsive to said equivalent resistance for regulating the rate of operation of said element to maintain a predetermined speed thereof.

4. An electrical regulating system for a drive means comprising a relatively large capacity condenser in a circuit having a relatively large time constant, a condenser of relatively small capacity, switch means in circuit with said small capacity condenser and with said large capacity condenser and operable for alternately charging said small capacity condenser from said large capacity condenser and thereafter discharging said small capacity condenser to develop an equivalent resistance in said condenser circuit directly proportional to the rate of operation of said switch means, said condenser charging and discharging circuit having a relatively small time constant, drive means for operating said switch means at a speed corresponding to the speed of said drive means, a bridge circuit of which said equivalent resistance including both said large and small capacity condensers forms one leg, means for changing the ratio of the bridge to establish a balanced condition in said bridge circuit, and means controlled by the equivalent resistance of said condenser circuit for regulating the speed of operation of said drive means.

5. An electrical system comprising a reservoir of electrical energy, a condenser, switch means in circuit with said condenser and said reservoir and operable for alternately charging said condenser from said reservoir and for discharging the same to develop an equivalent resistance in said condenser and reservoir circuit directly proportional to the rate of operation of said switch means, drive means for operating said switch means in predetermined speed relation therewith, a bridge circuit of which said equivalent resistance forms one leg, an amplifier circuit for amplifying the balance current in said bridge circuit, and means responsive to said amplified current for regulating the speed of operation of said drive means to maintain a predetermined rate thereof.

6. An electrical system of the character described comprising a reservoir of electrical energy, a condenser, switch means in circuit with said condenser operable and said reservoir for alternately charging said condenser from said reservoir and for discharging the same to develop an equivalent resistance in said condenser and reservoir circuit proportional to the rate of operation of said switch means, drive means for operating said switch means in predetermined speed relation therewith, a bridge circuit of which said equivalent resistance forms one leg, means for adjusting said bridge circuit to provide for a unidirectional flow of current in the balance circuit thereof when said drive means is operating at said predetermined rate, an electrical amplifier for amplifying said unidirectional balance current, and means controlled by the output of said amplifier for regulating the speed of operation of said drive means to maintain a predetermined rate thereof.

7. An electrical system of the character described comprising a reservoir of electrical energy, a condenser, switch means in circuit with said condenser and said reservoir and operable for alternately charging said condenser from said reservoir and for discharging the same to develop an equivalent resistance in said condenser and reservoir circuit proportional to the rate of operation of said switch means, drive means for operating said switch means in predetermined speed relation therewith, a bridge circuit of which said equivalent resistance forms one leg, means for converting the balance current flowing through said bridge circuit into an alternating current, an electronic amplifier for amplifying said balance current, a rectifier for rectifying said amplified current, and means controlled by said rectified current for regulating the speed of operation of said drive means to maintain a predetermined rate thereof.

8. An electrical system of the character described comprising a reservoir of electrical energy, a condenser, switch means in circuit with said condenser and reservoir and operable for alternately charging said condenser from said reservoir and for discharging the same to develop an equivalent resistance in said condenser and reservoir circuit proportional to the rate of operating of said switch means, drive means for operating said switch means in predetermined speed relation therewith, a bridge circuit of which said equivalent resistance forms one leg, an electronic amplifier, a chopper connected in the input and output circuits of said amplifier, for producing an alternating current for amplification by said amplifier and for rectification of said amplified current, means for supplying the balance current of said bridge circuit through said chopper to the input of said amplifier, and means responsive to the rectified output of said amplifier for regulating the rate of operation of said drive means.

9. An electrical regulating system comprising a relatively large capacity condenser in a circuit having a relatively large time constant, a pair of condensers of relatively small capacity, switch means in circuit with said large capacity condenser and with said small capacity condensers and operable for alternately connecting each of said small capacity condensers in circuit with said large capacity condenser to be charged therefrom while the other of said small capacity condensers is discharged to develop an equivalent resistance in the circuit of said condensers directly proportional to the rate of operation of said switch means, said condenser charging and discharging circuit having a relatively small time constant, drive means for operating said switch means in predetermined speed relation therewith, a bridge circuit of which said equivalent resistance forms one leg, and means responsive to the balance of said bridge circuit and variable in relation to said equivalent resistance for regulating the speed of operation of said drive means.

10. An electrical bridge circuit for regulating the speed of a moving element comprising a bridge circuit containing resistance elements in three of its legs and a relatively large capacity condenser in its fourth leg, a pair of condensers of substantially smaller capacity, resistance in circuit with said smaller capacity condensers, switch means operable in timed relation with the speed of said element for alternately connecting said smaller capacity condensers in circuit with said resistance and said larger capacity condenser and thereafter discharging the same, and means connected to said bridge circuit and responsive to the equivalent resistance of the leg of said circuit containing said large capacity condenser for controlling the speed of operation of said moving element.

11. An electrical bridge circuit for regulating the speed of a moving element comprising a bridge circuit containing resistance elements in three of its legs and a relatively large capacity condenser in its fourth leg, the time constant of said large capacity condenser in said circuit being relatively large, a pair of condensers of substantially smaller capacity, resistance in circuit with said smaller capacity condensers, the time constant of said smaller capacity condenser circuit being relatively small, means for driving said moving element, switch means operable in timed relation with the speed of said element for alternately connecting said smaller capacity condensers in circuit with said resistance and said larger capacity condensers and thereafter discharging the same, and means connected to said bridge circuit and responsive to the equivalent resistance of the leg of said circuit containing said large capacity condenser for regulating the speed of said drive means.

12. An electrical bridge circuit for regulating the speed of a drive motor comprising a bridge circuit containing resistance elements in three of its legs and a relatively large capacity condenser in its fourth leg, a pair of condensers of substantially smaller capacity, resistance in circuit with said smaller capacity condensers, switch means driven in timed relation with the speed of said motor for alternately connecting said smaller capacity condensers in circuit with said resistance and said larger capacity condenser and thereafter discharging the same, the time constant of said smaller capacity condenser circuit being relatively small in relation to the period of operation of said switch means, and means connected to said bridge circuit and responsive to the equivalent resistance of the leg of said circuit containing said large capacity condenser for regulating the speed of said motor.

FREDERICK J. HOOVEN.

References Cited in the file of this patent

UNITED STATES PATENTS

| Number | Name | Date |
| --- | --- | --- |
| 1,485,409 | Miller | Mar. 4, 1924 |
| 1,954,884 | Mears | Apr. 17, 1934 |
| 2,184,315 | Peters | Dec. 26, 1939 |